United States Patent
Toyota et al.

(10) Patent No.: US 6,338,527 B1
(45) Date of Patent: Jan. 15, 2002

(54) HEADREST SECURED AUTOMOBILE SEAT COVER

(75) Inventors: David K. Toyota, 2054 Via Teca, San Clemente, CA (US) 92673; Ronald Lee Sukut, San Clemente, CA (US)

(73) Assignee: David K. Toyota, San Clemente, CA (US)

( * ) Notice: Subject to any disclaimer, the term of this patent is extended or adjusted under 35 U.S.C. 154(b) by 0 days.

(21) Appl. No.: 09/488,891

(22) Filed: Jan. 21, 2000

Related U.S. Application Data

(63) Continuation-in-part of application No. 09/287,022, filed on Apr. 6, 1999, now Pat. No. 6,089,659.

(51) Int. Cl.$^7$ .......................... A47C 31/00; A47C 31/11

(52) U.S. Cl. ............. 297/229; 297/228.11; 297/228.12; 297/219.1

(58) Field of Search .............................. 297/229, 228.11, 297/228.12, 219.1, 218.1, 218.4, 218.5; 24/600.7, 116 A, 599.8, 302, 301

(56) References Cited

U.S. PATENT DOCUMENTS

| | | | |
|---|---|---|---|
| 1,836,302 A | | 12/1931 | Bloomfield ................. 297/229 |
| 2,626,163 A | | 1/1953 | Scantelbury ................ 24/16 A |
| 3,083,054 A | * | 3/1963 | Weaver ................. 297/228.12 |
| 3,113,326 A | * | 12/1963 | Hyde et al. ........... 297/219.1 X |
| 3,126,860 A | | 3/1964 | Shepperton ............... 24/301 X |
| 3,458,993 A | | 8/1969 | Greene ..................... 24/116 A |
| 3,463,436 A | | 8/1969 | Foster, Jr. ................ 24/116 A |
| D267,523 S | | 1/1983 | Neilson ............ 297/228.11 X |
| 4,383,712 A | | 5/1983 | Kaganas ................. 297/228.12 |
| 4,396,227 A | | 8/1983 | Neilson ................. 297/228.11 |
| 4,458,738 A | | 7/1984 | Wilson .................... 297/229 X |
| 4,718,721 A | * | 1/1988 | Pompa .................. 297/228.11 |
| 4,723,814 A | | 2/1988 | Hunt ....................... 297/229 X |
| 4,790,592 A | | 12/1988 | Busso et al. ............ 297/229 X |
| 4,824,168 A | * | 4/1989 | Makoski ...................... 297/229 |
| D307,370 S | | 4/1990 | Bailey et al. ................ D6/611 |
| 4,943,105 A | | 7/1990 | Kacar et al. ............ 297/229 X |
| 5,503,428 A | | 4/1996 | Awotwi et al. .......... 297/216.3 |
| 5,533,787 A | | 7/1996 | Xiang ..................... 297/284.5 |
| 5,613,730 A | | 3/1997 | Buie et al. ............. 297/228.12 |
| 5,803,539 A | | 9/1998 | Dewar et al. .......... 297/228.12 |
| 5,906,413 A | | 5/1999 | Yang ....................... 297/219.1 |
| 5,915,631 A | | 6/1999 | Laxton et al. ......... 297/228.11 |
| 5,957,528 A | * | 9/1999 | Campbell ............ 297/219.1 X |
| 6,089,659 A | * | 7/2000 | Toyota ................ 297/219.1 X |
| 6,170,100 B1 | * | 1/2001 | Le Gette et al. ...... 297/218.1 X |

FOREIGN PATENT DOCUMENTS

FR          1457481       11/1966   ................. 297/229

OTHER PUBLICATIONS

Ortho Breeze Mini Mesh 03470–01 Saddleman Inc., P.O. Box 3656, Logan UT 84323–3656 (01) page.

(List continued on next page.)

Primary Examiner—Peter M. Cuomo
Assistant Examiner—Rodney B. White
(74) Attorney, Agent, or Firm—Stetina Brunda

(57) ABSTRACT

A headrest secured seat cover for vehicles having side-impact airbags mounted within the sides of the seat. The cover comprises a bottom and middle portion attachable to the seat cushion. A top portion of the seat cover is attachable to the seat headrest. In order to attach the seat cover to the headrest, the seat cover includes at least one elastic strap attached to the top portion of the cover and configured to attach the top portion of the cover to mounting bars of the headrest. The seat cover further includes a stiffening member disposed about a periphery of the top portion of the seat cover. The stiffening member supports the top portion of the seat cover such that the seat cover will be contourable to the shape of the vehicle seat and remain in place. Since the seat cover is attached to the headrest, the sides of the seat are unobstructed for proper airbag inflation.

16 Claims, 2 Drawing Sheets

OTHER PUBLICATIONS

Natural Beaded Saddleman Inc., P.O. Box 3656, Logan UT 84323–3656 (03) pages.

Mohave 03653 (no wire present) Saddleman Inc., P.O. Box 3656, Logan UT 84323–3656 (02) pages.

Ventilated Cushion: Cool Rider—Deluxe Blue 03582–03 Saddleman Inc., P.O. Box 3656, Logan UT 84323–3656 (01) page.

Yokarl Industrial Co., Ltd. YU I Cushion Co., Ltd. Sunchine Copious Enterprise Co., Ltd. Web page from Sep. 8, 1999 of 3 pages.

Comfort Foam Cushion/Mohave Foam Cushion—Saddleman, Inc. Product Sheet.

Photograph Reproduction of the back of Mahave Foam Cushion—Saddleman, Inc.

4 Photograph reproductions of Seat Covers from—The Rocky Mountain Sheepskin Company of San Jose, Ca. (4 Sheets).

* cited by examiner

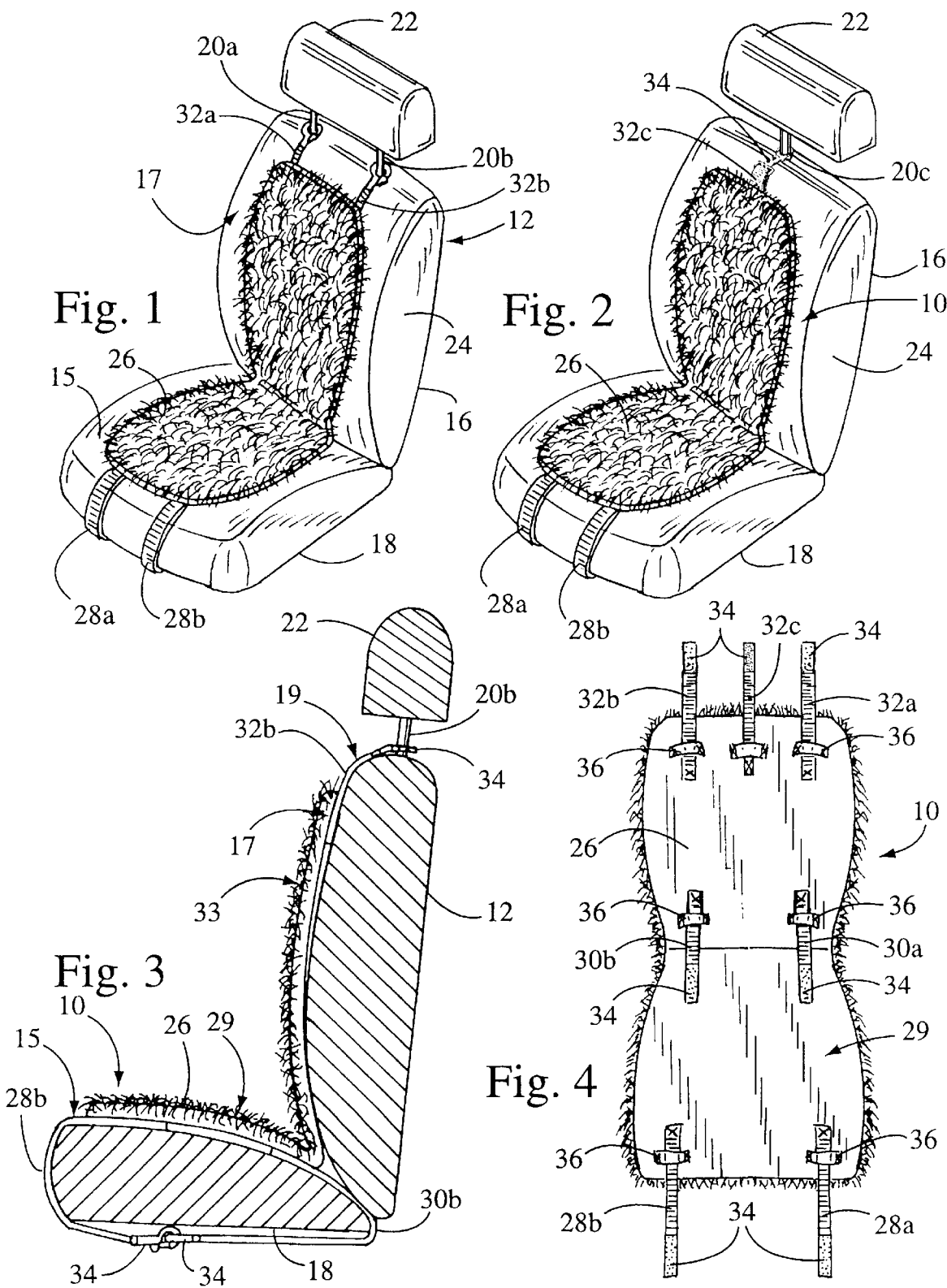

HEADREST SECURED AUTOMOBILE SEAT COVER

CROSS-REFERENCE TO RELATED APPLICATIONS

The present application is a continuation-in-part of U.S. application Ser. No. 09/287,022, filed on Apr. 6, 1999, now U.S. Pat. No. 6,089,659, entitled HEADREST SECURED AUTOMOBILE SEAT COVER, the disclosure of which is expressly incorporated herein by reference.

STATEMENT RE: FEDERALLY SPONSORED RESEARCH/DEVELOPMENT (Not Applicable)

BACKGROUND OF THE INVENTION

The present invention generally relates to vehicle seat covers and more particularly to a seat cover which is mounted to the headrest of a seat such that the cover can be used with vehicles equipped with seat mounted side-impact airbags.

Currently, there are a wide variety of covers for vehicle seats. Such covers are typically manufactured from wool, sheepskin or a synthetic material. The cover is fabricated to cover the front surface of the seat in order to protect the seat from damage and provide a luxurious surface for the occupant.

Typically, prior art seat covers are fastened to the seat through the use of straps which are extensible around the seatback and bottom portion of the seat. Alternatively, the seat cover may be fabricated in a sleeve-like configuration to be advanceable over the seat in order to retain the cover in place. Specifically, the cover is sewn together such that a pocket is formed in the top and/or bottom of the cover. The pocket is advanceable over the top and/or bottom of the seatback such that the cover fully or partially encapsulates the seat.

Vehicles are currently being equipped with side-impact airbags that protect occupants from injury sustained during collisions. The side-impact airbags can be mounted in the door, door frame or the seat itself. If the side-impact airbag is mounted in the seat, it is configured to inflate along the side of the seat nearest to the car door. The side-impact airbag projects forwardly from the side of the seat upon inflation to provide a cushion between the passenger and the car door during collisions.

Typically, prior art seat covers are secured to the seat such that the cover impedes the action of side-impact airbags mounted in the seat. The straps used to secure the seat cover to the seat wrap around the seat back at a location of the side-impact airbag. Therefore, the straps interfere with the inflation of the side-impact airbag that can lead to a potentially unsafe situation. Seat covers which are secured to the seatback through the use of a pocket that encases the top of the seat can also impede the inflation of side-impact airbags. The pocket covers a portion of the seatback where the airbag exits during inflation. Therefore, the side-impact airbag will not be able to inflate because it is impeded by the seat cover advanced thereover.

Some seat covers are fabricated with slits formed within the cover at the location of the side-impact airbag mounted within the seat. The slits allow the airbag to inflate through the seat cover despite the cover wrapping around the sides of the seat. However, if the slits are not large enough or not placed over the location of the airbags (e.g., when the cover shifts), then the cover will impede the immediate inflation of the seat mounted side-impact airbag.

The present invention addresses the deficiencies in the prior art seat covers by providing a cover that can be used with a seat containing side-impact airbags. Specifically, the present invention provides a seat cover that is mountable to a headrest such that the sides of the cover are clear of the sides of the seat such that the cover does not impede or interfere with the full deployment of the seat mounted side-impact airbag.

BRIEF SUMMARY OF THE INVENTION

In accordance with the preferred embodiment of the present invention, there is provided a seat cover configured to be attached to a vehicle seat. The vehicle seat has a backrest which defines a front surface and two sides, a bottom cushion which defines a top surface, and a headrest which is attached to the backrest via at least one support bar. Furthermore, the seat may include a side-impact airbag deployable from one of the sides of backrest. The cover comprises a backing having a bottom portion attachable to the bottom cushion so as to cover the top surface thereof and a top portion attachable solely to the support bar so as to cover the front surface of the backrest but not the sides thereof.

In order to attach the seat cover to the seat, the cover includes at least one top strap for facilitating attachment of the top portion to the support bar and at least one bottom strap for facilitating attachment of the bottom portion to the bottom cushion. Preferably, the present invention comprises a pair of bottom straps and further includes a pair of middle straps for facilitating attachment of the bottom portion to the bottom cushion. The vehicle may have two support bars and the cover will therefore have two top straps which are attachable to respective ones of the support bars. Preferably the straps are fabricated from an elastic material.

In order to attach the top strap to a respective support bar, a connector is attached to the top strap. The connector may be a strap fabricated from a hook and loop fastener material, a buckle, a hook and/or a ball and chain. Preferably, the backing of the seat cover is a wooly sheepskin material.

In the preferred embodiment of the present invention, the seat cover will further include a stiffening member disposed about a periphery thereof. Typically, the stiffening member is inserted within a sleeve sewn into the periphery of the seat cover backing. The stiffening member supports the cover from falling into itself. Accordingly, the stiffening member is disposed about the periphery of the top portion of the backing. In the preferred embodiment, the sleeve is slightly longer than the length of the stiffening member. The stiffening member may be fabricated from a bendable wire such that the top portion of the seat cover may be contoured to the backrest of the seat.

BRIEF DESCRIPTION OF THE SEVERAL VIEWS OF THE DRAWING

These as well as other features of the present invention, will become more apparent upon reference to the drawings wherein:

FIG. 1 is a front perspective view of a seat cover constructed in accordance with a preferred embodiment of the present invention as attached to a vehicle seat having a headrest which includes two support bars;

FIG. 2 is a front perspective view of the seat cover shown in FIG. 1 as attached to a vehicle seat having a headrest which includes a single support bar;

FIG. 3 is a left side view of the headrest secured seat cover and vehicle seat shown in FIG. 1;

FIG. 4 is a plan-view of the rear surface of the seat cover shown in e FIG. 1;

DETAILED DESCRIPTION OF THE INVENTION

Figure 5:
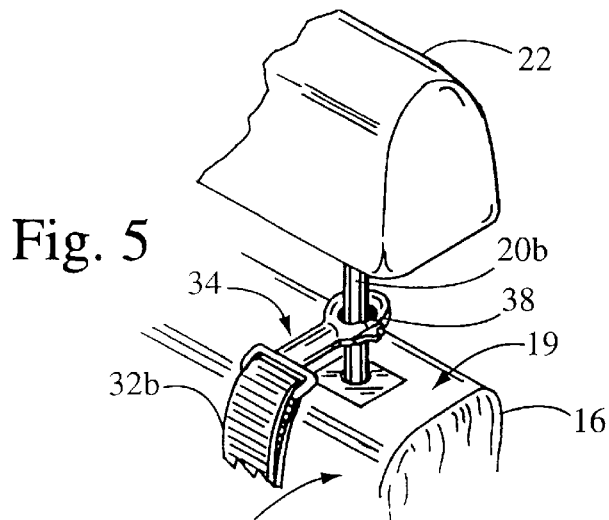
FIGS. 5, 6 and 7 are exploded perspective views showing alternative structures which may be employed to facilitate the attachment of the present seat cover to the headrest of the vehicle seat.

Referring now to the drawings wherein the showings are for purposes of illustrating a preferred embodiment of the present invention only, and not for purposes of limiting the same, FIG. 1 perspectively illustrates a seat cover 10 attached to a vehicle seat 12. The vehicle seat 12 includes a bottom cushion 18 and an upright backrest 16. The bottom cushion 18 defines a top surface 15 and the backrest 16 defines a front surface 17 which are used to support an occupant of the seat 12. Supported on a top surface 19 of backrest 16 via two support bars 20a, 20b is a headrest 22. The headrest 22 is disposed on the top surface 19 of the backrest 16 and is adjustable both upwardly and downwardly. Alternatively, the headrest 22 may be attached to the backrest 16 with one support bar 20c as seen in FIG. 2. The seat 12 further includes a side-impact airbag disposed within a side of the seat 12 that is disposed furthest from the center of the vehicle. The side-impact airbag is covered with a removable side panel 24. During an impact with another vehicle, the side-impact airbag will inflate thereby opening the side panel 24 of seat 12. In order for proper inflation of the side impact airbag, the side panel 24 of seat 12 must be unobstructed such that the panel 24 can be opened by the force of the inflating airbag acting thereagainst.

The seat cover 10 constructed in accordance with the preferred embodiment of the present invention allows the seat mounted side-impact airbag to inflate in an unobstructed manner. Specifically, the seat cover 10 does not cover or obstruct the side panel 24 of seat 12. As seen in FIG. 1, the seat cover 10 comprises a backing 26 that covers the top surface 15 of bottom cushion 18 and the front surface 17 of backrest 16. The backing 26 can be cloth, neoprene, sheepskin or any other type of pliable material. In the preferred embodiment of the present invention, the backing 26 comprises a cloth layer that forms the underside thereof and directly contacts the top surface 15 of bottom cushion 18 and the front surface 17 of backrest 16. Sewn and glued to the cloth layer is a wooly sheepskin layer that defines the exposed surface of the backing 26. The cloth layer of the backing 26 protects the seat 12 from the oils contained within the sheepskin layer. Typically, the backing 26 has a bottom portion 29 and a top portion 33 and completely covers the top surface 15 of bottom cushion 18 and the front surface 17 of backrest 16. However, the backing 26 does not extend over the side panel 24 so as not to impede the proper inflation of a side-impact airbag.

In order to attach the backing 26 to the vehicle seat 12 without obstructing the side panel 24, the seat cover 10 includes a series of straps which secure the seat cover 10 to the seat 12. Specifically, the seat cover 10 comprises bottom straps 28a and 28b, middle straps 30a and 30b, and top straps 32a, 32b, and 32c as seen in FIG. 4. The straps 28a, 28b, 30a, 30b and 32a, 32b, 32c are preferably made from an elastic material such that the straps 28a, 28b, 30a, 30b, and 32a, 32b, 32c can stretch when pulled. Alternatively, the straps 28a, 28b, 30a, 30b and 32a, 32b, 32c may be fabricated from a non-stretchable material wherein buckles are used for adjusting the straps 28a, 28b, 30a, 30b and 32a, 32b, 32c.

The bottom straps 28a and 28b are typically attached to the underside of the backing 26 at the forward most edge of the bottom portion 29. As seen in FIGS. 1 and 4, bottom strap 28a is attached to the backing 26 near one side edge of the backing 26 and the other bottom strap 28b is attached near the opposite side edge of the backing 26. An end of each bottom strap 28a, 28b may be sewn or glued to the backing 26, while the opposite end may have a connector 34 attached thereto. Each bottom strap 28a, 28b is led through a respective loop 36 that aids in positioning each strap 28a, 28b relative to each side edge of the backing 26.

As seen in FIGS. 1 and 3, each bottom strap 28a, 28b is configured to wrap around the front of the bottom cushion 18. Each connector 34 is attached to the distal end of a respective bottom strap 28a, 28b is configured to be attachable to the cushion 18 or to a respective one of the middle straps 30a, 30b as seen in FIG. 3. Since the bottom straps 28a and 28b are preferably elastic, the straps 28a and 28b may be connected to any various parts of the seat 12 so long as the seat cover 10 is secured in place and does not move.

Alternatively, each bottom strap 28a, 28b may have a connector 34 attached to each of the opposed ends thereof. In such a configuration, neither strap 28a, 28b is permanently affixed to the backing 26, but rather led through a respective loop 36. In this respect, each strap 28a, 28b can run freely through a respective loop 36.

The middle straps 30a and 30b are attached to a middle portion the backing 26. Specifically, each of the middle straps 30a, 30b have one end attached to the backing 26 and a connector 34 attached to a respective distal end. As seen in FIG. 4, each of the middle straps 30a, 30b are led through a respective loop 36 attached to the backing 26. The middle straps 30a, 30b are configured to be attachable to the seat 12 and/or respective ones of the bottom straps 28a, 28b. In this respect, the straps 30a, 30b are led into and through the crease defined between the backrest 16 and the bottom cushion 18. The crease is formed from the conventional vehicle seat construction wherein the backrest 16 and bottom cushion 18 are not an integral unit. In an alternate configuration, the middle straps 30a, 30b may be configured with connectors 34 attached to each of the opposed ends thereof. In this respect neither strap 30a, 30b is permanently affixed to the backing 26 but rather led through a respective loop 36.

The top straps 32a, 32b, and 32c allow the seat cover 10 to be attached to a seat 12 without obstructing either sides of the backrest 16 thereof. Specifically, the top straps 32a, 32b attach the seat cover 10 to the two support bars 20a, 20b disposed on the top surface 19 of backrest 16, as seen in FIG. 1. Alternatively, the top strap 32c is configured to attach the seat cover 10 to a single support bar 20c as seen in FIG. 2. This attachment method permits the top portion 33 of the seat cover 10 to be supported on the front surface of the backrest 16 of the seat 12. Each elastic top strap 32a, 32b and 32c is attached to the backing 26 near the top edge of top portion 33 as seen in FIG. 4. Attached to a distal end of each strap 32a, 32b, and 32c is a connector 34. Each top strap 32a, 32b, and 32c is led through a respective loop 36 in a manner similar to the bottom straps 28a, 28b and middle straps 30a, 30b.

Figure 6:
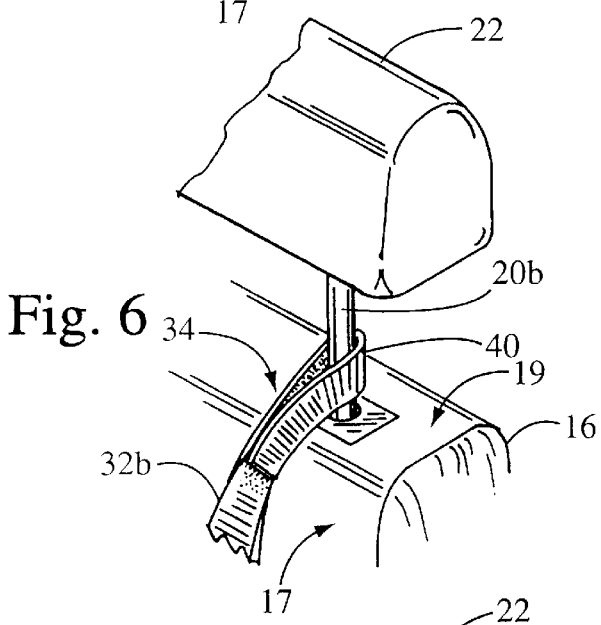
Figure 7:
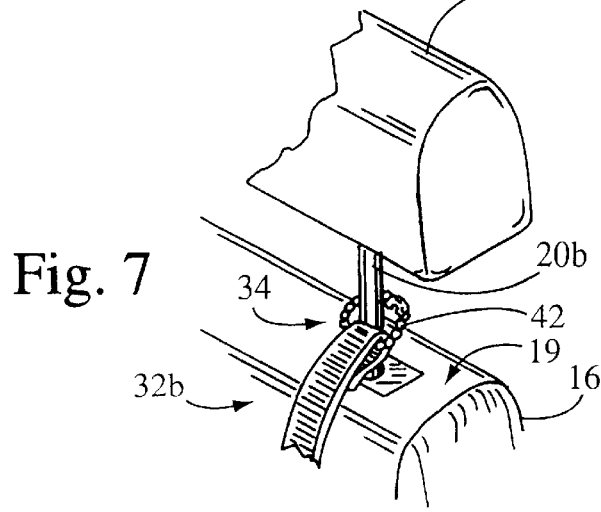

The connector 34 attached to each top strap 32a, 32b, and 32c can be a hook 38 as shown in FIG. 5. The hook 38 is attachable to a respective support bar 20a, 20b or 20c of the headrest 22. Alternatively, as seen in FIG. 6, the connector 34 may be a strap 40 fabricated from a hook and loop fastener material (i.e., Velcro)or a ball and snap chain 42, as seen in FIG. 7. The strap 40 and ball and snap chain 42 are both adaptable to be used on various types of support bars 20a, 20b and 20c. Additionally, a snap buckle may be used as the connector 34.

Since the bottom straps 28a, 28b, middle straps 30a, 30b, and top straps 32a, 32b, 32c are preferably elastic, the seat cover 10 constructed in accordance with the preferred embodiment of the present invention can be secured to various types of vehicle seats 12. Therefore, the present invention provides a "one size fits all" seat cover. The top straps 32a, 32b, and 32c retain the seat cover 10 on the backrest 16 without covering the side panel 24. Therefore, a seat cover 10 constructed in accordance with the present invention can be used on vehicles with seat mounted side-impact airbags.

The seat cover 10 can be used with vehicles that have a headrest 22 attached to backrest 16 through a single support bar 20c as seen in FIG. 2 or two support bars 20a, 20b as seen in FIG. 1. In the preferred embodiment of the present invention, the seat cover 10 is manufactured with all three top straps 32a, 32b and 32c. The purchaser is able to select which straps should be used to attach the seat cover 10 to the headrest support bars 20a, 20b, and 20c. The top straps 32a, 32b, and 32c that are not used in attaching the seat cover 10 to the seat 12 can then be removed.

As will be recognized by those of ordinary skill in the art, the bottom portion of seat cover 10 can be secured to the cushion 18 in a conventional manner. The seat cover 10 could be formed such that the backing 26 slips over the front of cushion 18 in a sleeve-like manner. The backing 26 would form a pocket near the bottom portion 29 of cover 10 that is sized and configured to slip over the front of cushion 18. Bottom straps 28a and 28b would not be used since the seat cover 10 slips over the front of cushion 18. However, the middle straps 30a and 30b would be used to secure the middle portion of the seat cover 10 to the seat 12.

Figure 8:
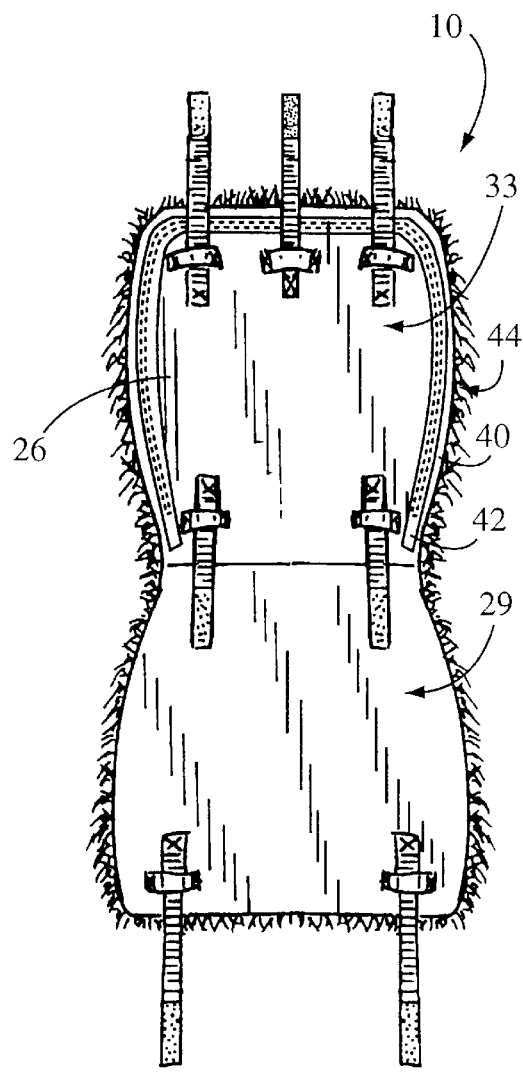
FIG. 8 is a plan-view of the rear surface of the seat cover shown in FIG. 1 and including a stiffening member.

Referring to FIG. 8, the seat cover 10 of the present invention may further include a stiffening member 40 sewn into the underside of the backing 26. The stiffening member 40 is attached to the underside of the backing 26 around a periphery 44 (i.e., outside edges) of the top portion 33 of the seat cover 10. In the preferred embodiment, the stiffening member 40 is sewn into the backing 26 through the use of a sleeve 42. The sleeve 42 may be formed by turning over the edges of the backing 26 through conventional sewing techniques. Accordingly, as seen in FIG. 8, the sleeve 42 extends around the periphery 44 of the backing 26 of the top portion 33 and is slightly larger than a diameter of the stiffening member 40. In this respect, the stiffining member 40 is insertable into the sleeve 42. In the preferred embodiment, the length of sleeve 42 is slightly longer than the length of stiffening member 40 such that the backing 26 may bunch around the stiffening member 40 when the seat cover 10 is attached to vehicle seat 12.

The stiffening member 40, when disposed within sleeve 42, supports the periphery 44 of the seat cover 10 when attached to the vehicle seat 12. In this respect, the stiffening member 40 provides rigidity to the seat cover 10 such that the top portion 33 of the backing 26 can mold to the contour of the upright backrest 16. Without the stiffening member 40, the top portion 33 of the backing 26 has a tendency to flop over onto itself when attached to the vehicle seat 12.

In the preferred embodiment, the stiffening member 40 is formed from bendable 10 gauge plastic coated wire. The wire provides rigidity to the backing 26, while still being able to be contoured to the shape of the upright backrest 16. It will be recognized that other types of material may be used for the stiffening member 40 (i.e., plastic or stiffened paper). While the stiffening member 40 has been described as being disposed about the periphery of the top portion 33 of the backing 26, it will be recognized that the bottom portion 29 of the backing 26 may also include a stiffening member (not shown) in order to maintain the bottom portion 29 in contact with the bottom cushion 18 of the vehicle seat 12. Accordingly, a stiffening member for the bottom portion 29 would be sewn into the periphery thereof in the manner described for the top portion 33.

Additional modifications and improvements of the present invention may also be apparent to those of ordinary skill in the art such as using different connectors 34 to attach the top straps 32a, 32b, and 32c to the headrest support bars 20a, 20b, and 20c. Thus, the particular combination of parts described and illustrated herein is intended to represent only a certain embodiment of the present invention, and is not intended to serve as limitations of alternative devices within the spirit and scope of the invention.

What is claimed is:

1. A seat cover for a contoured automobile seat having an upright backrest which defines a top surface, the seat cover comprising:

a backing having a bottom portion and a periphery, the backing being engageable to the bottom cushion so as to at least partially cover the top surface thereof, the backing further having a top portion having a periphery and attachable to the upright backrest so as to at least partially cover the front surface thereof; and a pliant stiffening member disposed about the periphery of the top and bottom portions of the backing, the stiffening member being moldable upon installation so as to support and retainably conform the backing to the contours of the automobile seat.

2. The seat cover of claim 1, wherein the backing is fabricated from wooly sheepskin.

3. The seat cover of claim 1, wherein the stiffening member is sewn into the backing.

4. The seat cover of claim 1, further comprising a sleeve disposed about the periphery of the top portion, the sleeve being sized and configured such that the stiffening member is insertable therein.

5. The seat cover of claim 4, wherein the sleeve is fabricated from the backing.

6. The seat cover of claim 4, wherein the sleeve has a linear length slightly longer than a linear length of the stiffening member.

7. The seat cover of claim 1, wherein the stiffening member is wire.

8. The seat cover of claim 1, wherein the stiffening member is fabricated from a bendable material.

9. In a vehicle seat having a backrest which defines a front surface and two sides, a bottom cushion which defines a top surface, a headrest attached to the backrest via at least one support bar, and a side-impact airbag deployable from one of the sides of the backrest, a cover configured to be attached to the vehicle seat and not interfere with the deployment of the air bag, the cover comprising:

a backing having a bottom portion attachable to the bottom cushion so as to at least partially cover the top surface thereof and a top portion having a periphery and attachable solely to the support bar so as to at least partially cover the front surface of the backrest but not the sides thereof;

at least one top strap attached to the backing for facilitating the attachment of the top portion to the support bar;

at least one bottom strap attached to the backing for facilitating the attachment of the bottom portion to the bottom cushion;

at least one middle strap attached to the backing for facilitating the attachment of the bottom portion to the bottom cushion; and a stiffening member disposed about the periphery of the top portion and configured to support the top portion when attached to the support bar.

10. The cover of claim 9, further comprising a sleeve disposed about the periphery of the top portion, the sleeve being sized and configured such that the stiffening member is insertable therein.

11. The cover of claim 10, wherein the sleeve is fabricated from the backing.

12. The cover of claim 10, wherein the sleeve has a length slightly larger than a length of the stiffening member.

13. The cover of claim 9, wherein the stiffening member is sewn into the backing.

14. The cover of claim 9, wherein the backing is wooly sheepskin.

15. The cover of claim 9, wherein the stiffening member is fabricated from a bendable material.

16. The cover of claim 9, wherein the stiffening member is fabricated from wire.

* * * * *